(12) United States Patent
Buentello et al.

(10) Patent No.: US 11,670,171 B1
(45) Date of Patent: Jun. 6, 2023

(54) NAVIGATION SYSTEM (71) Applicant: UIPCO, LLC, San Antonio, TX (US)

(72) Inventors: Andre Rene Buentello, San Antonio, TX (US); Gregory David Hansen, San Antonio, TX (US); Jose L. Romero, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/806,875

(22) Filed: Jun. 14, 2022

Related U.S. Application Data

(63) Continuation of application No. 16/427,789, filed on May 31, 2019, now Pat. No. 11,393,339.

(60) Provisional application No. 62/753,523, filed on Oct. 31, 2018.

(51) Int. Cl.
*G08G 1/16* (2006.01)
*B60Q 9/00* (2006.01)
*G01C 21/34* (2006.01)
*B60W 30/09* (2012.01)

(52) U.S. Cl.
CPC ............. *G08G 1/161* (2013.01); *B60Q 9/008* (2013.01); *G01C 21/3461* (2013.01); *B60W 30/09* (2013.01)

(58) Field of Classification Search
CPC .... G08G 1/161; B60Q 9/008; G01C 21/3461; B60W 30/09
See application file for complete search history.

(56) References Cited

U.S. PATENT DOCUMENTS 9,786,178 B1 * 10/2017 Bai ........................ G08G 1/166

* cited by examiner

*Primary Examiner* — Nicholas Kiswanto
*Assistant Examiner* — Jamal A Shah
(74) *Attorney, Agent, or Firm* — Plumsea Law Group, LLC (57) ABSTRACT

A system for preventing collisions between users of the system. The system includes a central processing server receiving first path information relating to a first user and second path information relating to a second user. The central processing server determines a projected path of each user. The central processing server compares the projected paths identifies points of intersection, which are locations that put the users at risk of a collision. The central processing server sends navigation directions to avoid the collision to the first user.

20 Claims, 10 Drawing Sheets

NAVIGATION SYSTEM

CROSS-REFERENCE TO RELATED APPLICATIONS

This application is a Continuation of Buentello et al., U.S. Pat. No. 11,393,339, issued on Jul. 19, 2022, and titled "Navigation System," which claimed the benefit of U.S. Provisional Patent Application Ser. No. 62/753,523 filed Oct. 31, 2018 and titled "Navigation System." The disclosures of every application listed above are incorporated by reference herein in their entirety for all purposes.

BACKGROUND OF THE INVENTION

1. Field of the Invention

The present application relates to a navigation system. In particular, the application relates to a navigation system and method that increases pedestrian safety.

2. Description of Related Art

Pedestrian safety in a mixed-user environment has been and continues to be a source of concern. A pedestrian is vulnerable to collisions with vehicles, particularly because the pedestrian has no protective equipment. Even in a collision with a bicycle can cause significant harm to a pedestrian.

In a mixed-user environment, vehicles may be using paths that intersect with a pedestrian's path. For example, bicycles, scooters, skateboards, and even roller skaters may be using the sidewalk or the street. Users of these and similar modes of transportation typically are moving significantly faster than a pedestrian and often may approach a pedestrian from behind. To transition from the sidewalk to the street, users of these modes of transport often converge on curb cuts or ramps that transition from one level to the other, concentrating movement in that area.

Whereas a pedestrian collision with one of these vehicle users, or a collision between two such users, may be injurious to the pedestrian, a collision with any vehicle that typically uses only the street, such as a car, truck, van, or bus of any sort typically would be much more serious for a pedestrian. Although traffic signals are intended to regulate the interactions of vehicles and pedestrians, not every user follows the rules, and, inevitably, mistakes are made.

There is a need in the art for a system and method that addresses the shortcomings of the prior art discussed above.

SUMMARY OF THE INVENTION

In one aspect, an embodiment relates to a system for preventing collisions between users of the system. The system includes a central processing server receiving first path information relating to a first path of a first user and second path information relating to a second path of a second user. The central processing server determines a first projected path of the first user and a second projected path of the second user. The central processing server compares the first projected path and the second projected path and identifies points of intersection. Points of intersection are locations that put the first user and the second user at risk of a collision. The central processing server sends navigation directions to avoid the collision to the first user.

In another aspect, an embodiment relates to system for preventing collisions between users of the system including a mobile application. Each user uses a mobile device having an instance of a mobile application operating therein. A first instance of the application is associated with a first user and a second instance of application associated with a second user. The mobile device exchanges information with a central processing server.

The central processing server receives first path information relating to a first path of the first user and second path information relating to a second path of the second user. The central processing server determines a first projected path of the first user and a second projected path of the second user.

The central processing server compares the first projected path and the second projected path and identifies points of intersection putting the first user and the second user at risk of a collision. The central processing server sends to the first user navigation guidance to the mobile application to avoid the collision.

Another aspect of the disclosure is directed to a method for preventing collisions between a first user of a navigation system and a second user of the navigation system. In accordance with an embodiment, the method includes providing information about a first path of the first user and a second path of the second user to a central processing server. A first projected path of the first user and a second projected path of the second user are determined. The first projected path of the first user and the second projected path of the second user are compared. The purpose of the comparison is to identify points of intersection. A point of intersection puts the first user and the second user at risk of a collision.

Information is exchanged between the central processing server and a mobile application. A first instance of the application is associated with the first user and a second instance of the application is associated with the second user. Navigation guidance is provided to the first instance of the mobile application.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

In one aspect, an embodiment relates to a system for preventing collisions between users of the system. The system includes a central processing server receiving first path information relating to a first path of a first user and second path information relating to a second path of a second user. The central processing server determines a first projected path of the first user and a second projected path of the second user. The central processing server compares the first projected path and the second projected path and identifies points of intersection. Points of intersection are locations that put the first user and the second user at risk of a collision. The central processing server sends navigation directions to avoid the collision to the first user.

In another aspect, an embodiment relates to system for preventing collisions between users of the system including a mobile application. Each user uses a mobile device having an instance of a mobile application operating therein. A first instance of the application is associated with a first user and a second instance of application associated with a second user. The mobile device exchanges information with a central processing server.

The central processing server receives first path information relating to a first path of the first user and second path information relating to a second path of the second user. The central processing server determines a first projected path of the first user and a second projected path of the second user.

The central processing server compares the first projected path and the second projected path and identifies points of intersection putting the first user and the second user at risk of a collision. The central processing server sends to the first user navigation guidance to the mobile application to avoid the collision.

Another aspect of the disclosure is directed to a method for preventing collisions between a first user of a navigation system and a second user of the navigation system. In accordance with an embodiment, the method includes providing information about a first path of the first user and a second path of the second user to a central processing server. A first projected path of the first user and a second projected path of the second user are determined. The first projected path of the first user and the second projected path of the second user are compared. The purpose of the comparison is to identify points of intersection. A point of intersection puts the first user and the second user at risk of a collision.

In an embodiment, information is exchanged between the central processing server and a mobile application. A first instance of the application is associated with the first user and a second instance of the application is associated with the second user. Navigation guidance is provided to the first instance of the mobile application.

Some of the illustrations in the specification and drawings may indicate or describe unlawful or otherwise inappropriate behavior. For example, a number of the drawing figures illustrate or contemplate that a vehicle might enter a cross walk when a pedestrian is present in the crosswalk. These figures should not be taken as an endorsement of such behavior. Rather, utilizing such circumstances makes it easier to describe embodiment of the disclosure and to bring the merits of the subject matter of the disclosure to the forefront.

Figure 1:
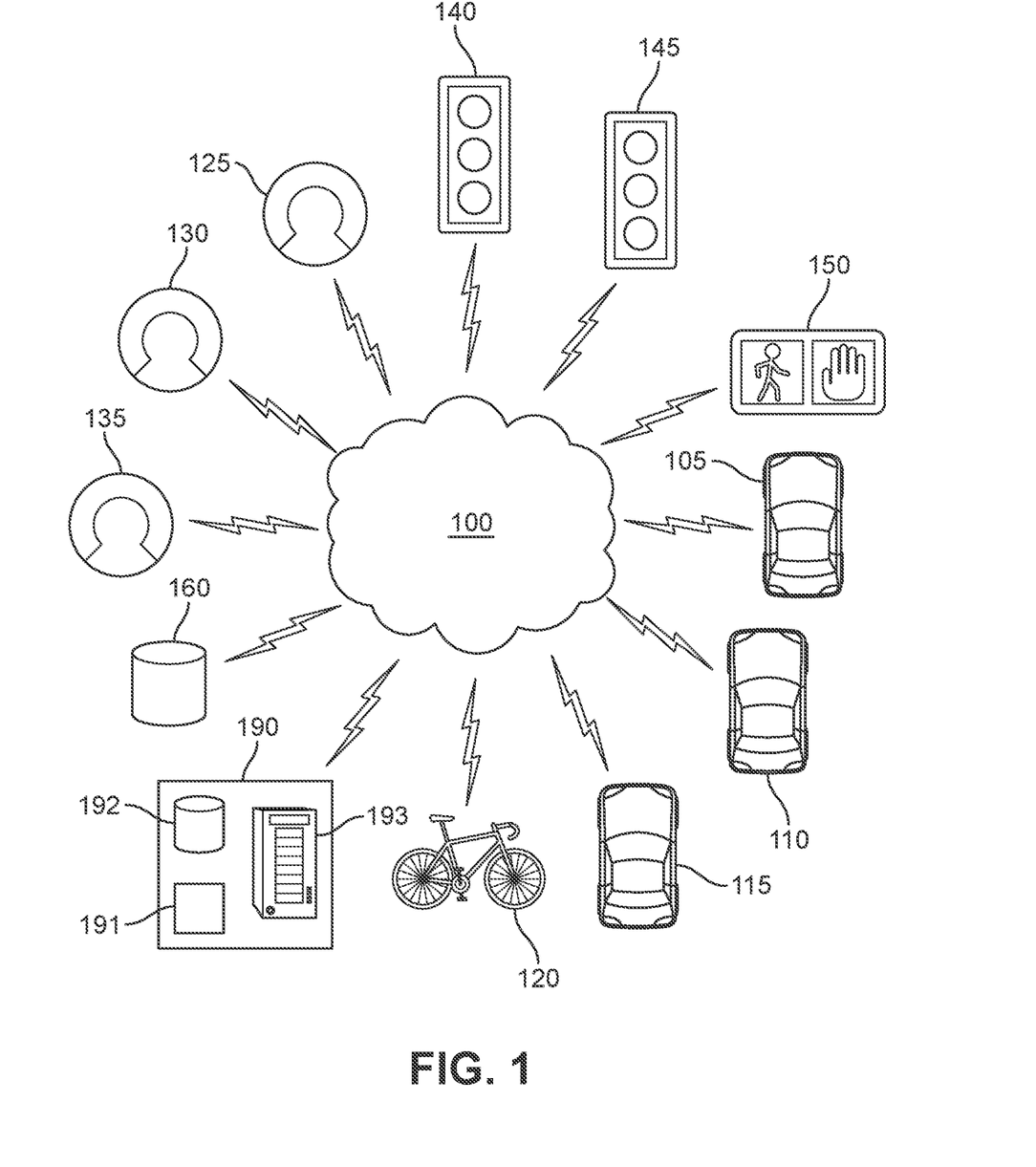
FIG. 1 is a schematic representation of an embodiment of a navigation system.

An embodiment is illustrated in FIG. 1. FIG. 1 is a schematic of an internet 100 hosting various aspects of an embodiment of a navigation system herein. Central processing server 190 includes processor 191 and data bank 192 connected to the internet through server 193. The embodiment of the navigation system further includes storage unit 160. In particular, storage unit 160 may be a global positioning unit (GPS) containing information related to the area of service of the navigation system. The GPS may be used by the system to determine locations of users and other information required to provide information to users of the system.

Users of the system include first vehicle 105, second vehicle 110, and third vehicle 115. Although the vehicles are illustrated as automobiles, vehicles may include pick-up trucks, vans, trucks of any type, taxi cabs, and buses. Vehicles also may include first responders and emergency vehicle. First pedestrian 125, second pedestrian 130, and third pedestrian 135 also may be users of the navigation system. Bicycle 120 is illustrative of a bicycle rider. Bicycle 120 also may represent a skateboarder, a roller skater, or anyone riding a bicycle, a skateboard, a scooter, or other substantially self-powered device. Although these devices may be considered wheeled vehicles and often are operated in a street rather than on an adjacent walkway or side walk, they offer little protection from a collision. Further, the mode of operation of these self-powered devices often involves activities, behavior, and mannerisms that more closely mimic those of pedestrians rather than the activities, behavior, and mannerisms of vehicles and their drivers. For convenience herein, therefore, substantially self-powered devices will be characterized and described as pedestrians.

Central processing server 190 exchanges information by way of internet 100 with other devices as well. Automatic controlled traffic information or data is obtained from first traffic signal 140. Such controlled traffic information includes coil-controlled lights and CCTV traffic cameras. Thus, traffic signal information can be used during the calculation of vehicle positions. Similarly, information regarding traffic flow and the like may be obtained from a "smart road," i.e., a road that relays information to a central operating office. Second traffic signal 145 provides information when an emergency vehicle or other vehicle that has signal control authority invokes that authority and changes which vehicle or vehicles have authority to enter the intersection. This information is especially useful in the avoidance of collisions with emergency vehicles. Third traffic signal 150 is addressed to pedestrians and indicates periods when pedestrians have the right of way to enter the street and, in contradistinction, periods when pedestrians do not have the right of way to enter the street. This information is useful when determining which of conflicting users should be granted the right of way. Traffic signal preemption thus may be a result of a signal from an emergency vehicle that is received directly by members of the navigation system.

Traffic signal preemption may also be enacted by central processing server 190 after central processing server 190 receives a signal from the entity, such as an emergency vehicle, seeking preemption, and central processing server 190 instructs each of the relevant signals to provide navigation guidance to pedestrians and vehicles.

Central processing server 190 receives information from members of the internet navigation system and provides information to members. Information forwarded to members of the navigation system may include data on the speed of a member, such as a vehicle or a pedestrian. Similar information may be received from a member, if that member is capable of providing such information. For example, a mobile device may have an instance of GPS resident therein. Such a mobile device may provide raw data, such as position taken in latitude and longitude, and changes in these values over time. Central processing server 190 may then calculate position and speed to determine a track, and then calculate a proposed track. In an alternative embodiment, mobile device may provide the track and speed over the track to central processing server 190, and leave it to central processing server 190 to calculate a proposed future path.

Figure 2:
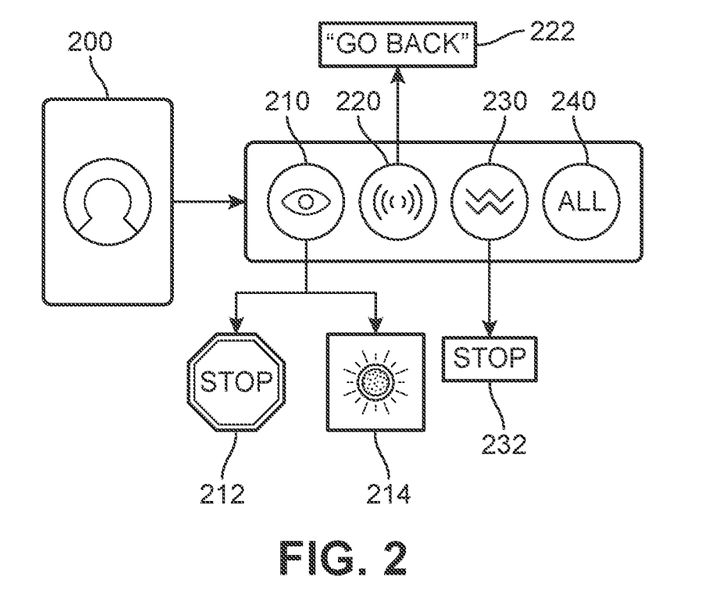
FIG. 2 is a representation of a mobile device for use by a pedestrian using an embodiment of the navigation system.

FIG. 2 illustrates a mobile device that may be used by a pedestrian during use of an embodiment of the system. Mobile device 200 illustrates that a pedestrian is using the system. During use of an embodiment of the system, a pedestrian may receive information visually, as illustrated at 210. For example, mobile device 200 may display the word 'STOP' in a traditional octagonal stop sign, as at 212, or may just display a flashing light, as at 214. Other words, such as non-English language words, or symbols, such as international symbols, may be used in an embodiment. The display may be selected or tailored to the user's convenience, preference, or needs.

Similarly, mobile device 200 may emit an audio signal in an embodiment, as illustrated at 220. For example, if the system predicts a collision, an audio signal such as 'go back' may be announced, as illustrated at 222 for an embodiment. In some embodiments, the mobile device may vibrate, as illustrated at 230. Typically, in some embodiments, the vibration signal will be accompanied by a visual signal, as illustrated at 232, where the word 'STOP' is shown. An audio signal, which may be the word 'STOP' as shown in the embodiment illustrated in FIG. 2 at 232. At button 240, the pedestrian is free to select every mode of signal simultaneously.

Figure 3:
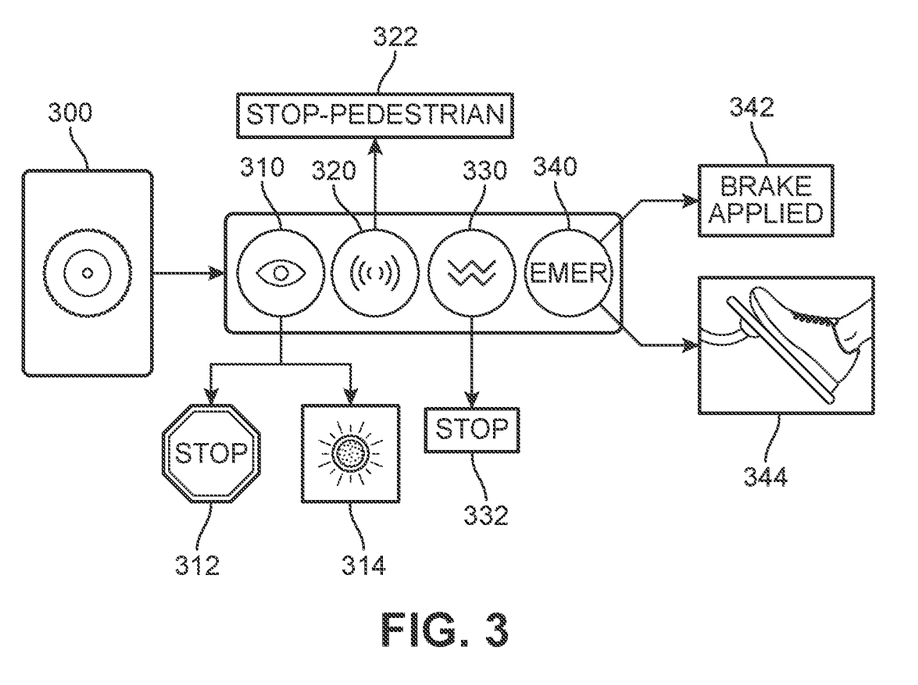
FIG. 3 is a schematic representation of a mobile device for use in a vehicle using an embodiment of the navigation system.

In contradistinction, a vehicle user of an embodiment of the system is presented with mobile device 300 having an embodiment such as that illustrated in FIG. 3. Typically, in embodiments, the vehicle user does not have an option to select a single mode of announcement. Rather, visual mode 310, audio mode 320, and vibration mode 330, announce simultaneously.

Signals similar to those used for the pedestrian user may be used in embodiments of vehicle device 300. For example, visual announcements under 310 may include 'Stop' in the traditional octagonal sign 312 or flashing light 314 may be used in an embodiment. Audio warnings 320 may be the same as for pedestrians, or may be different. As seen at 322, a written warning, such as 'STOP' or the much more informative "STOP-PEDESTRIAN" may be exhibited.

A vibratory warning 330 also will be given, together with a visual warning on the face of mobile device 300. 'STOP' is suitable for visual warning 332. In the event of an emergency, such as a predicted collision, all modes will be used to announce "BRAKE APPLIED," as at 342, and the brakes are applied. A visual indicator of a foot on a brake pedal, as shown at 344, also may be shown in embodiments.

FIG. 4 through FIG. 10 illustrate how various events may be depicted in embodiments of the disclosure. Each is an overhead view of a potential scenario together with a view of a mobile device being used by a pedestrian and a mobile device being used in the vehicle.

Figure 4:
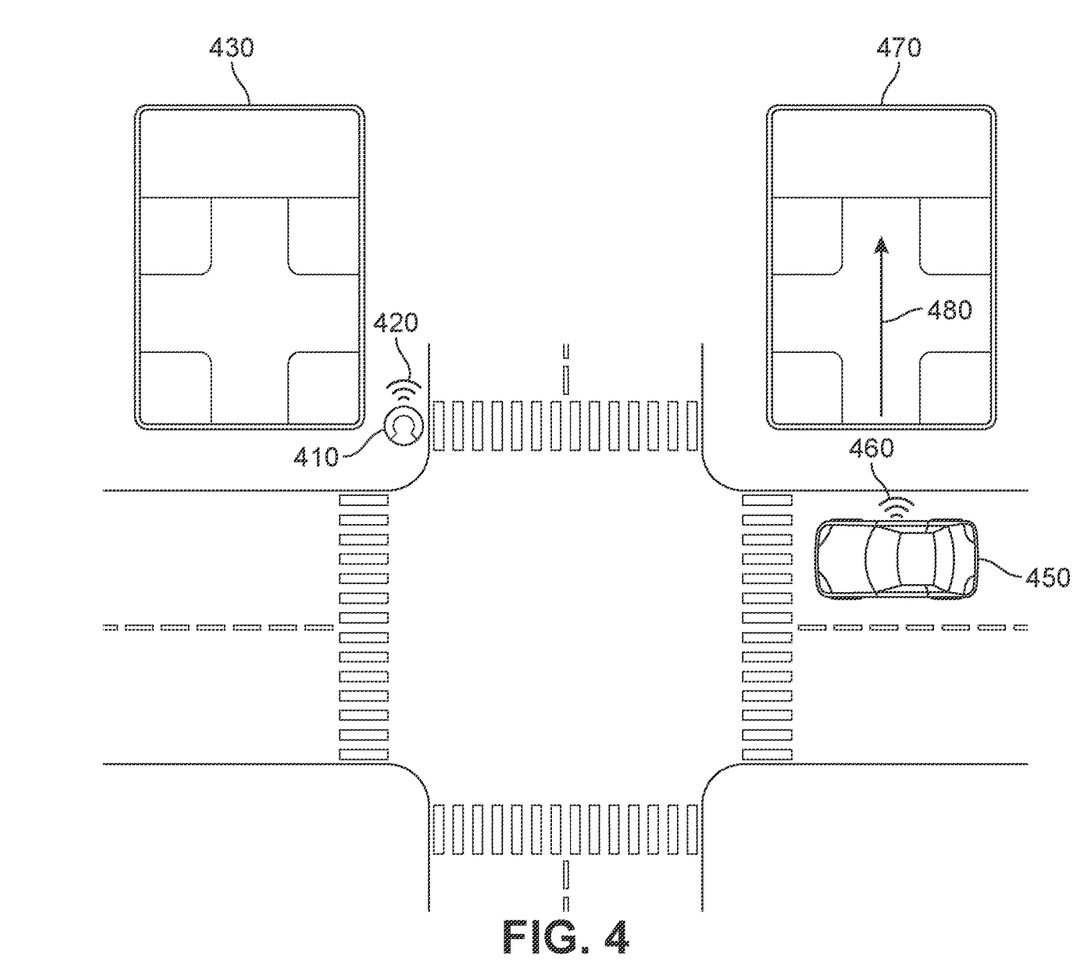
FIG. 4 is a schematic representation of an embodiment of a non-threatening situation and a representation of the mobile devices.

For example, FIG. 4 illustrates how an event involving minimal interaction of a vehicle and a pedestrian may be depicted on mobile device 430 used by pedestrian 410 and on mobile device 470 used in vehicle 450. Pedestrian 410 is illustrated as being connected to the navigation system at 420. In this embodiment, mobile device 430 is blank, as pedestrian 410 is not moving and there are no threats.

As pedestrian 410 waits on the side walk, vehicle 450 is shown connected to the navigation system at 460. Central processing server 190 in the navigation system has predicted or determined that vehicle 450 will be moving straight through the intersection and will not be turning toward pedestrian 410. For example, central processing server 190 may make this determination by predicting that vehicle 450 intends to go straight by the speed and direction of the vehicle. The speed and direction of vehicle 450 may have been estimated by noting in GPS 160 the position of vehicle 450 as it changes during its approach to the intersection and a calculation by central processing server 190. Alternatively, in another embodiment, if vehicle 450 is using a GPS device on mobile device 470, a GPS depiction of the intended route of vehicle 450 can be received by central processing server 190. In either embodiment, mobile device 470 illustrates the intention to go straight through the intersection. Because there is no potential conflict between pedestrian 410 and vehicle 450, no warnings are given.

Figure 5:
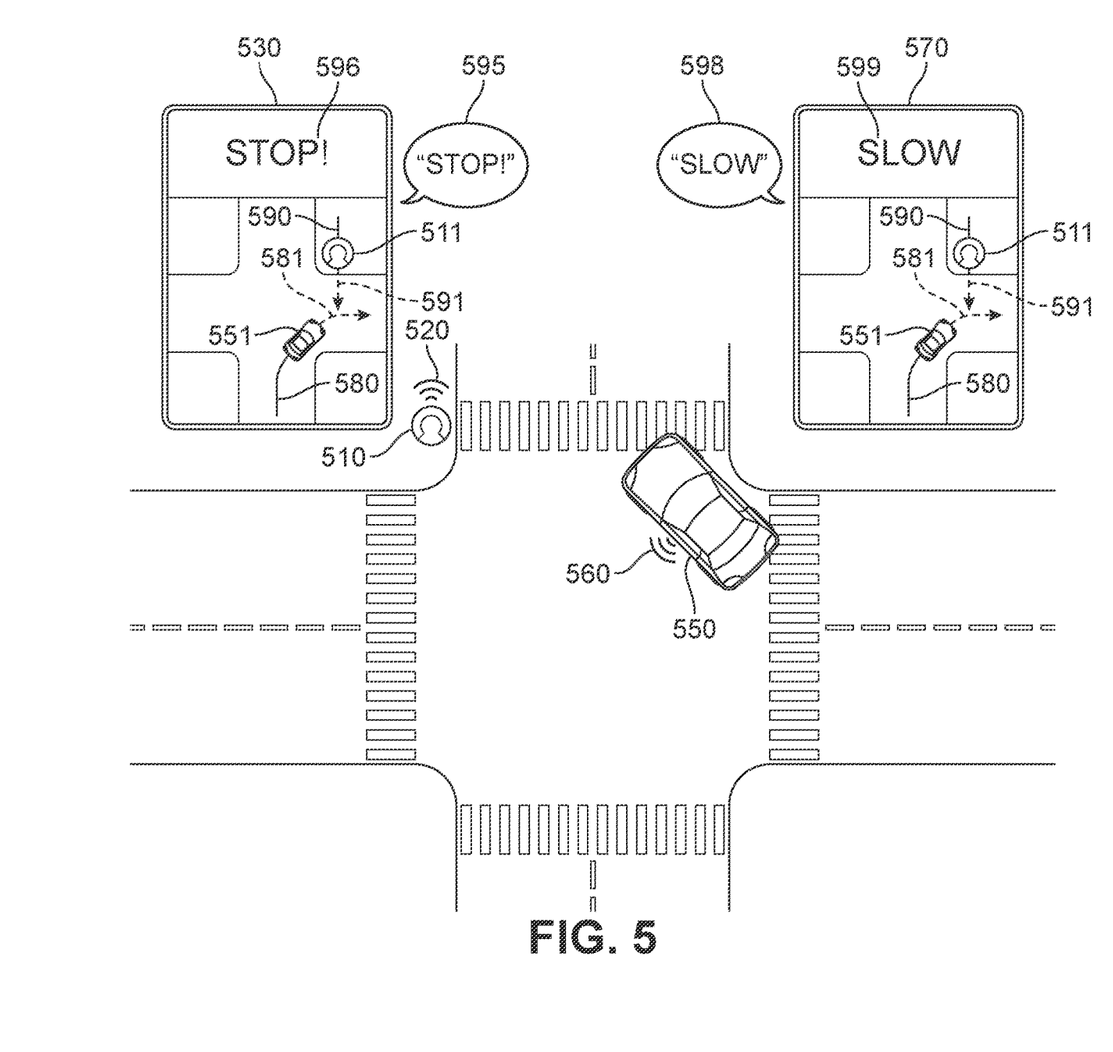
FIG. 5 is a schematic representation of an embodiment of another situation and a representation of the mobile devices.

FIG. 5 illustrates a situation in which a slight danger develops between pedestrian 510 and vehicle 550. Pedestrian 510 is connected to the navigation system at 520, and vehicle 550 is connected to the navigation system through 560.

Pedestrian 510 is standing on the side walk, and is depicted at 511 in mobile device 530. Vehicle 550 is depicted at 551 in mobile device 570.

Mobile device 530 further illustrates that pedestrian 511 has followed path 590 and predicts that the pedestrian will continue on path 591 into the intersection. Mobile device 530 further depicts that the path of vehicle 551 has resulted in a right turn and depicts that the car will continue on projected path 581.

In this embodiment, each mobile device contains the same traffic information, but a different navigational or route guidance for each user. As can be seen, vehicle 551 is predicted to cross the predicted path of pedestrian 511. The central processing server has, in this embodiment of this scenario, determined or predicted both the projected path of the pedestrian and the projected path of the vehicle.

In this embodiment, the central processing server provides route guidance to both pedestrian 510 and moving vehicle 550. In particular, because the central processing server has calculated that the chance of a collision is relatively low, the central processing server sends guidance to pedestrian 510 to stop. This guidance can be seen at 596 at the top of mobile device 530, where the word "STOP!" appears. The same guidance is given audibly at 595.

Further in this embodiment, the central processing server also provides route guidance to moving vehicle 550. As can be seen at the top of mobile device 570, the word "SLOW" appears on mobile device 570, and "SLOW" is heard at 598.

Figure 6:
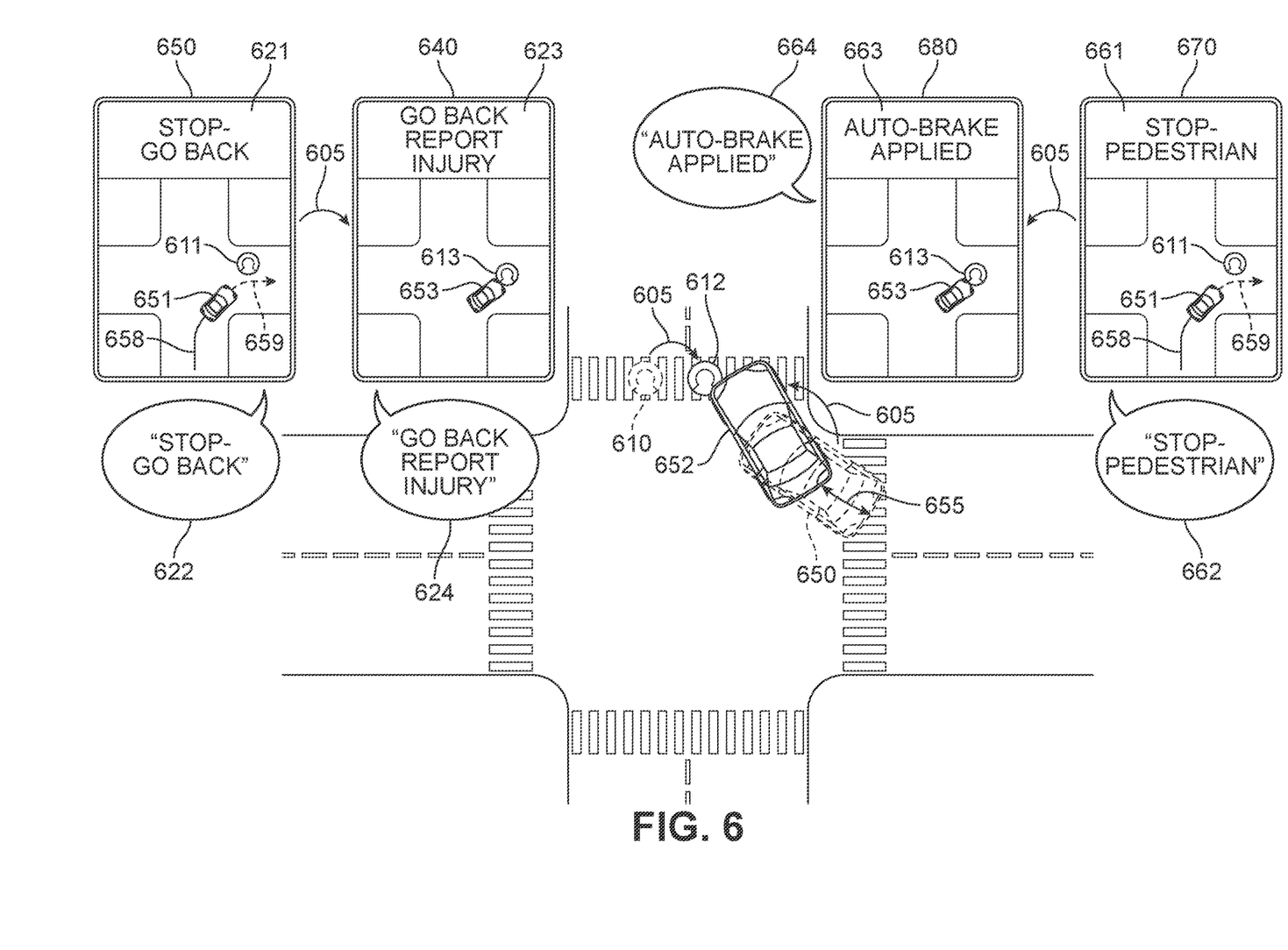
FIG. 6 is a schematic representation of an embodiment of a dangerous situation that devolves into a collision and a representation of the mobile devices.

FIG. 6 illustrates a more serious interaction, as the central processing server determines that a collision may occur. For convenience, for the remainder of the figures, the 'wireless connection' depiction of moving entities will not be illustrated on the drawing figures.

FIG. 6 illustrates a likely collision and the moments just before the collision, which are shown in phantom. In this embodiment, vehicle 650 has begun a turn that will take the vehicle through the crosswalk. Pedestrian 610 has already entered the crosswalk. This scenario is depicted on both pedestrian mobile device 650 and vehicle mobile device 670, where pedestrian 610 is depicted as 611 and vehicle 650 is depicted as vehicle 651. The path 658 of vehicle 651 is shown, and the predicted path of vehicle 651 is shown as 659. The predicted path of pedestrian 611 is not shown on the mobile device because it is so short.

Moments before the likely collision, navigation guidance is provided through mobile device 650 to pedestrian 610 to stop and to go back, both visually at 621 and audibly at 622, if pedestrian 610 has selected these features. At the same time, vehicle 650 is instructed through mobile device 670 to stop because there is a pedestrian in the projected path. Vehicle 650 receives both visual warning 661 and audio warning 662.

If pedestrian 610 or vehicle 650 does not obey the navigation guidance provided, they move closer to a collision, as shown by movement arrow 605, to positions pedestrian 612 and vehicle 652. Vehicle 650 moves the distance illustrated by distance arrow 655. At that time, pedestrian 612 and vehicle 652 are essentially co-located, indicating that a collision may have or did occur. Mobile device 680 indicates to vehicle 652 that the brake was automatically applied and illustrates a potential collision between the pedestrian, illustrated as pedestrian 613 on mobile device 680, and the vehicle, illustrated as 653 on mobile device 680. The same display appears on mobile device 640 used by pedestrian 612, but the navigation guidance is to go back, as illustrated at the visual guidance 623 and audible guidance 624 on mobile device 640. Mobile device 640 also suggests that any injury be reported.

Figure 7:
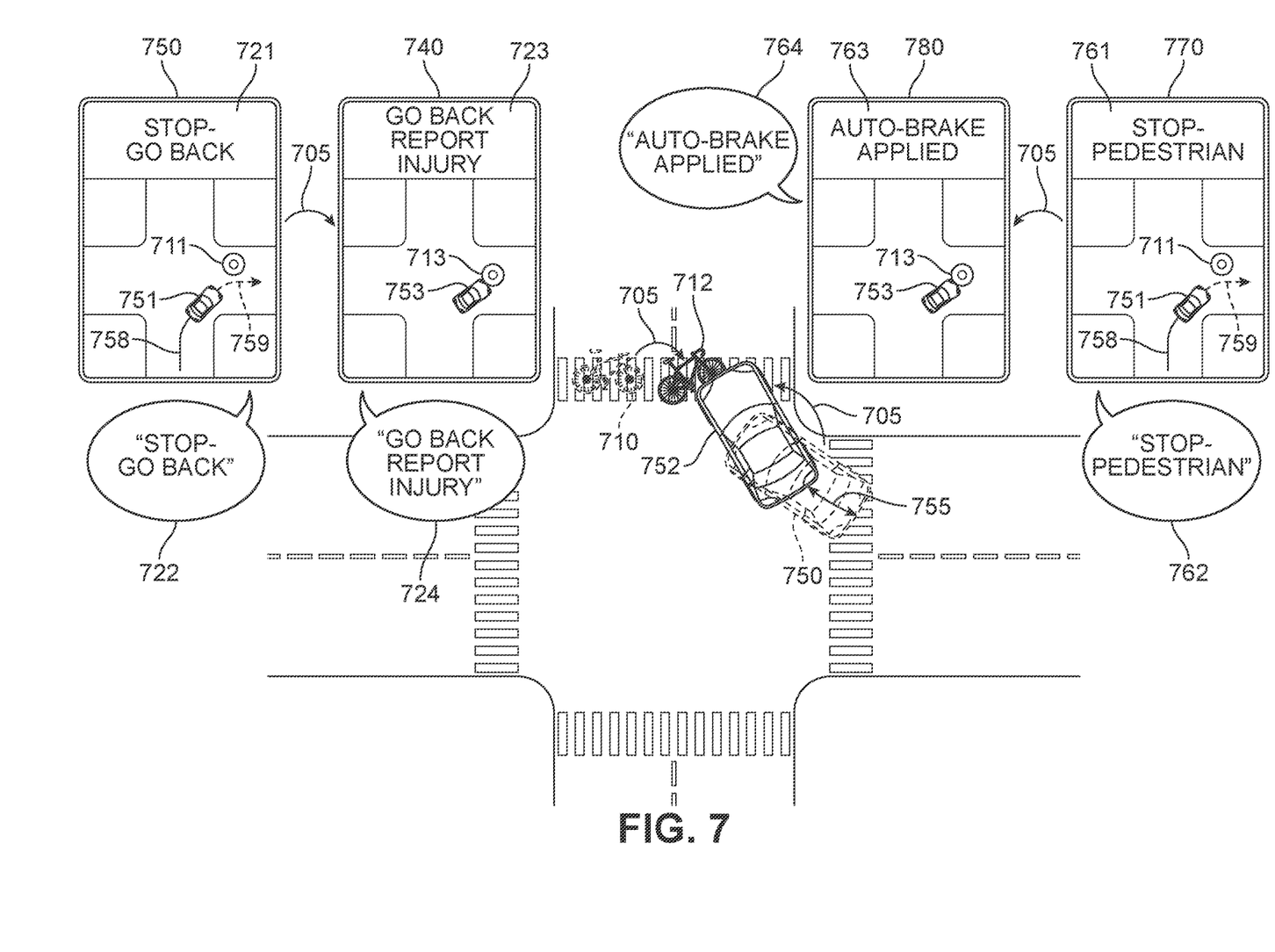
FIG. 7 is a schematic representation of an embodiment of another situation and a representation of the mobile devices.

FIG. 7 illustrates a similar serious interaction, as the central processing server determines that a collision may occur between bicycle 710 and vehicle 750. FIG. 7 illustrates a likely collision and the moments just before the collision, which are shown in phantom. In this embodiment, vehicle 750 has begun a turn that will take the vehicle through the crosswalk. Bicyclist 710 has already entered the crosswalk. This scenario is depicted on both bicycle mobile device 750 and vehicle mobile device 770, where bicyclist 710 is depicted as 711 and vehicle 750 is depicted as vehicle 751. The path 758 of vehicle 751 is shown, and the predicted path of vehicle 751 is shown as 759. The predicted path of bicyclist 711 is not shown on the mobile device because it is so short.

Moments before the likely collision, navigation guidance is provided through mobile device 750 to bicyclist 710 to stop and to go back, both visually at 721 and audibly at 722, if bicyclist 710 has selected these features. At the same time, vehicle 750 is instructed through mobile device 770 to stop because there is a bicyclist in the projected path. Vehicle 750 receives both visual warning 761 and audio warning 762.

If bicyclist 710 or vehicle 750 does not obey the navigation guidance provided, they move closer to a collision, as shown by movement arrow 705, to positions bicyclist 712 and vehicle 752. Vehicle 750 moves the distance illustrated by distance arrow 755. At that time, bicyclist 712 and vehicle 752 are essentially co-located, indicating that a collision may have or did occur. Mobile device 780 indicates to vehicle 752 that the brake was automatically applied and illustrates a potential collision between the bicyclist, illustrated as bicyclist 713 on mobile device 780, and the vehicle, illustrated as 753 on mobile device 780. The same display appears on mobile device 740 used by bicyclist 712, but the navigation guidance is to go back, as illustrated at the visual guidance 723 and audible guidance 724 on mobile device 740. Mobile device 740 also suggests that any injury be reported.

Figure 8:
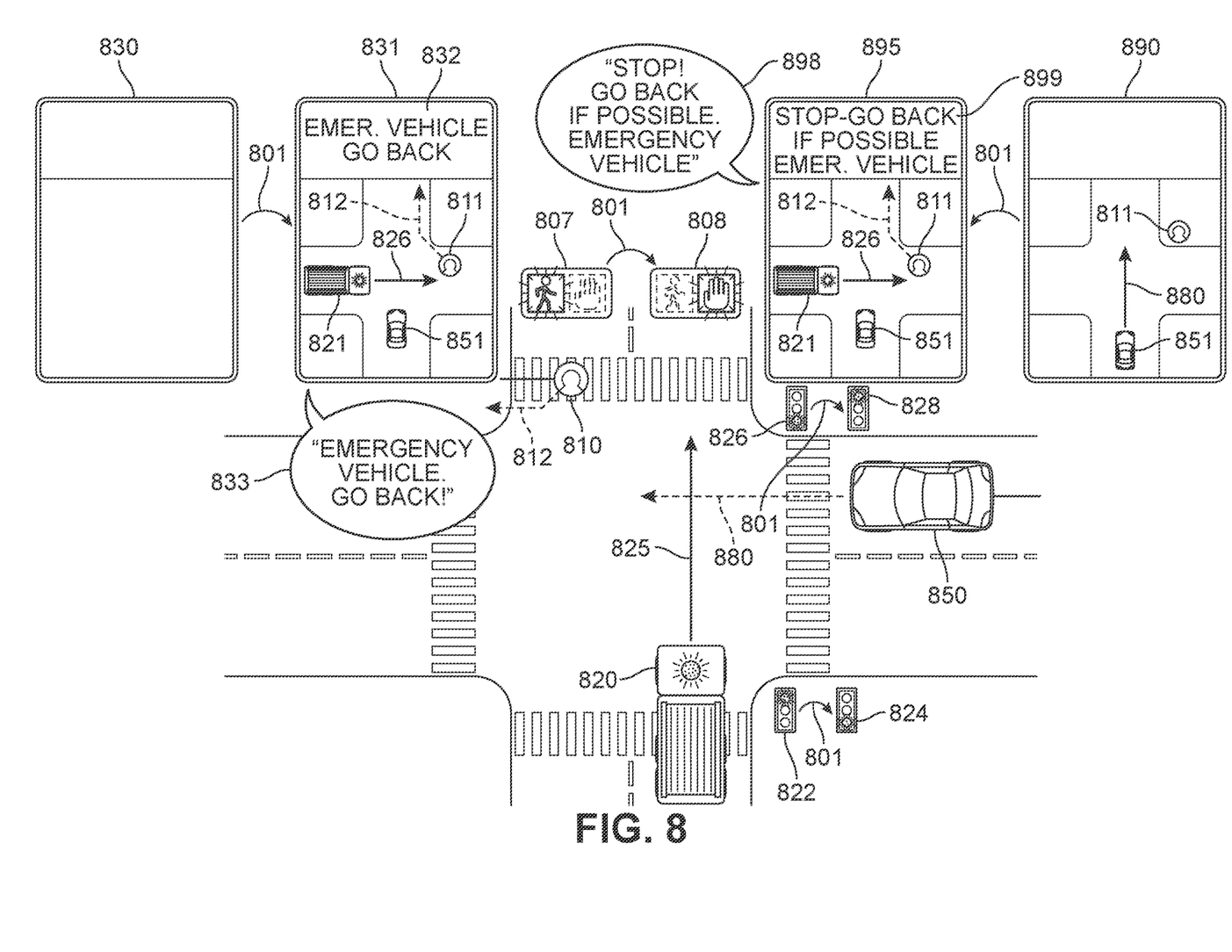
FIG. 8 is a schematic representation of an embodiment of still another situation and a representation of the mobile devices.

FIG. 8 illustrates a circumstance wherein an emergency vehicle or another vehicle that can exercise authority over traffic signals. Traffic signal preemption is an important tool for enabling emergency vehicles to travel quickly and safely to their destinations.

Emergency vehicle 820 may be, for example, a fire truck or an ambulance. As emergency vehicle 820 approaches the intersection, traffic signal 822 is red. However, after emergency vehicle 820 exercises signal preemption, traffic signal 822 turns to green traffic signal 824, as illustrated at preemption arrow 801. Emergency vehicle 820 intends to follow path 825 through the intersection, thus encountering vehicle 850 and pedestrian 810.

As vehicle 850 approaches the intersection, traffic signal 826 is green, but changes to red traffic signal 828 in view of signal preemption 801. Similarly, at the same times and for the same reasons, pedestrian signal 807 changes in view of signal preemption 801 from walk, with the walking person on the signal illuminated, to pedestrian signal 808. Thus, the navigation system provides navigation guidance to vehicle 850 and to pedestrian 810 through the traffic signals. The navigation system also provides navigation guidance through the mobile devices used by the pedestrian and by the vehicle.

Mobile device 890, in use in vehicle 850 first shows that the vehicle, depicted as vehicle 851, intends to follow a straight path through the intersection. Pedestrian 810, illustrated as pedestrian 811 in mobile device 890, is on the sidewalk, ready to enter the intersection. Neither mobile device 830 used by pedestrian 810 nor mobile device 890 used in the vehicle provides navigation guidance because none is necessary until the traffic signal intervention changes the traffic signals. Thus, the navigation guidance areas on both mobile devices are blank.

However, when the traffic signals are changed by the traffic signal intervention by emergency vehicle 820, the screens of both mobile devices change to present an illustration of the relationships of the vehicle and the pedestrian. Now, pedestrian 810, illustrated as 811 on the mobile devices, has entered the intersection. Navigation guidance is provided by the change of the traffic signal from 807 to 808, by visual warning 832, and by audio warning 833, if pedestrian 810 has engaged these warnings. The navigation guidance is presented both visually and audibly as follows: "Emergency vehicle—go back." In response to these warnings, pedestrian 810 follows projected path 812 back to the safety of sidewalk.

At the same time, the navigation system has issues visual navigation guidance 899 vehicle mobile device 895 to "Stop—go back if possible. Emergency vehicle." The same navigation guidance is announced audibly at 898. Thus, both pedestrian 810 and vehicle 850 are instructed to stop and go back, if possible.

Figure 9:
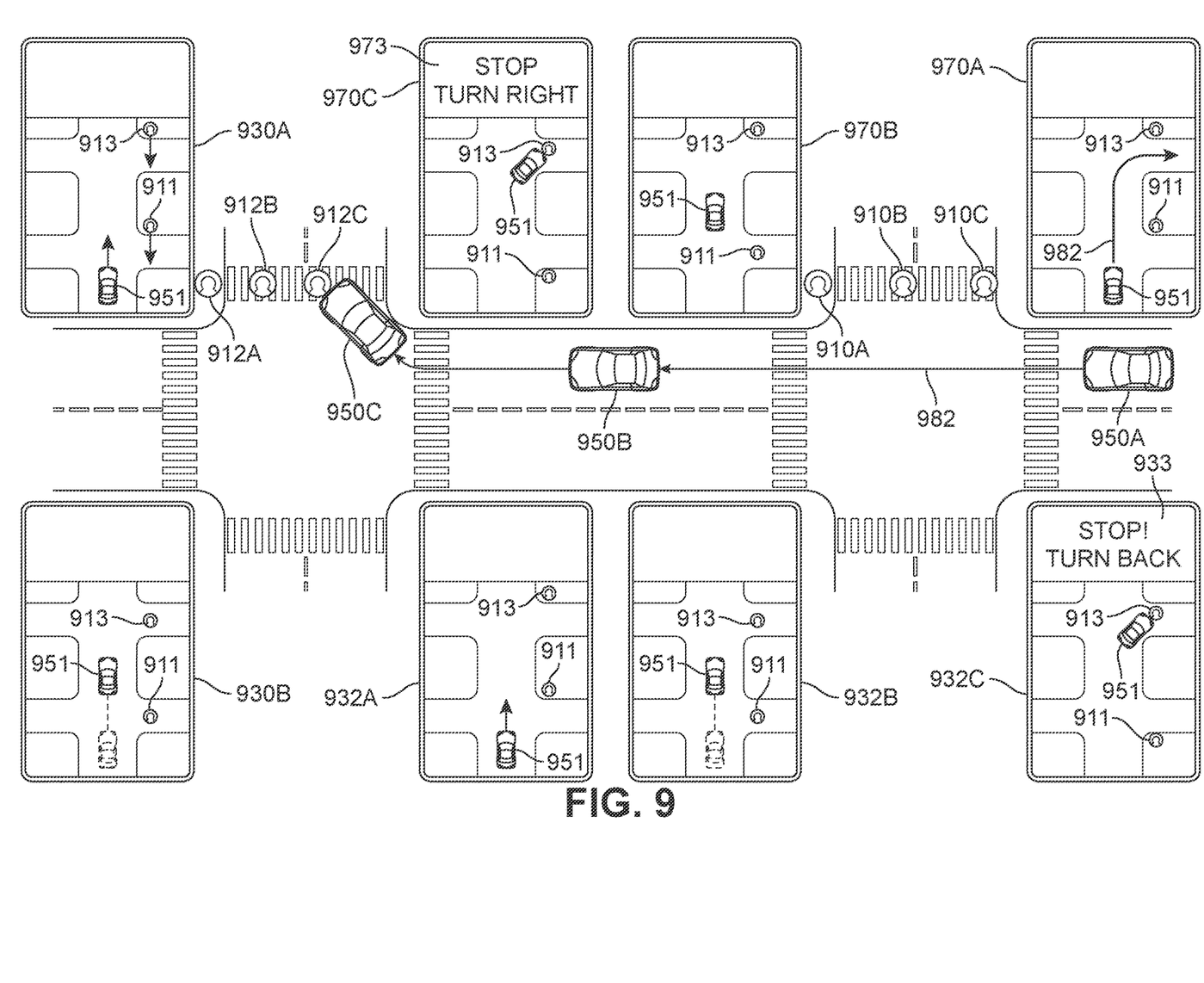
FIG. 9 is a schematic representation of an embodiment of yet another situation and a representation of the mobile devices.

FIG. 9 illustrates an interaction among one vehicle 950, first pedestrian 910, and second pedestrian 912. In particular, FIG. 9 illustrates a sequence of three events as vehicle 950 starts from position A and passes through position B to position C, as illustrated by vehicle 950A, vehicle 950B, and vehicle 950C. First pedestrian 910A also moves through position B at 910B and ends at pedestrian 910C. Second pedestrian 912A similarly movers through position 912B to position 912C. On FIG. 9, positions labelled A occur at the same time, positions labelled B occur at a second time later than the first time, and positions labelled C occur at a third time later than the second time.

In position A on FIG. 9, vehicle 950A is approaching an intersection with a predicted path 982. Path 982 is established in central processing server 190 as it is a path that a GPS provided as directions to vehicle 950. The path of first pedestrian 910 is predicted by central processing server 190, and the path of second pedestrian 912 is predicted by central processing server 190. First pedestrian 910A and second pedestrian 912A are on different sidewalks preparing to cross different streets. These positions are illustrated at least on mobile device 970A, which illustrates path 982 for depicted vehicle 951, first pedestrian depicted as 911, and second pedestrian depicted as 913.

The display of mobile device 930A is essentially the same as that of mobile device 970A, as there are no threats to the vehicle or to either pedestrian. In mobile device 930A, used by first pedestrian 910, the projected path for each of first pedestrian, second pedestrian, and vehicle 950 is illustrated as it relates to depiction 951 for the vehicle, depiction 911 for first pedestrian 910. All of this information, except that information relating to the projected paths also is illustrated on mobile device 932A. As second pedestrian 912 is not affected by this movement, no path is shown on the mobile device.

As vehicle 950 moves straight through the intersection from position 950A to position 950B, pedestrian 910 enters the intersection and moves from position 910A to position 910B. These positions are illustrated on mobile device 970B and on mobile device 930B. Because the central processing server does not predict any collisions between the path of first pedestrian 910 and path 982 during this movement, the instruction portion of mobile device 930A is blank, as is the instruction portion of mobile device 932A, and that of mobile device 970A. Similarly, because no collisions are predicted as part of the position B, the text message from navigation guidance areas of the mobile devices also are blank. Similarly, audible guidance also is not appropriate.

As vehicle 950C approaches the second intersection, it begins a right turn, in accordance with the proposed route stored on the central processing server 190 for vehicle 950C. This turn is illustrated on mobile device 970C and mobile device 932C. Pedestrian 912C, depicted on the mobile devices as 913C, is dangerously close to vehicle 950C, depicted on each of mobile devices 970C and mobile device 932C. As vehicle 950C and pedestrian 912C come closer to each other, central processing server 190 issues new guidance to each. The navigation guidance for vehicle 950 is illustrated in area 973 of mobile device 970C, and it instructs the driver of vehicle 950 to "stop and turn right" to avoid a collision. The same navigation instruction is given orally. At the same time, mobile device 932C instructs the passenger to "stop and turn back" in the visual mode, and repeats the same message audibly. A collision may be avoided if the navigation guidance is followed.

Figure 10:
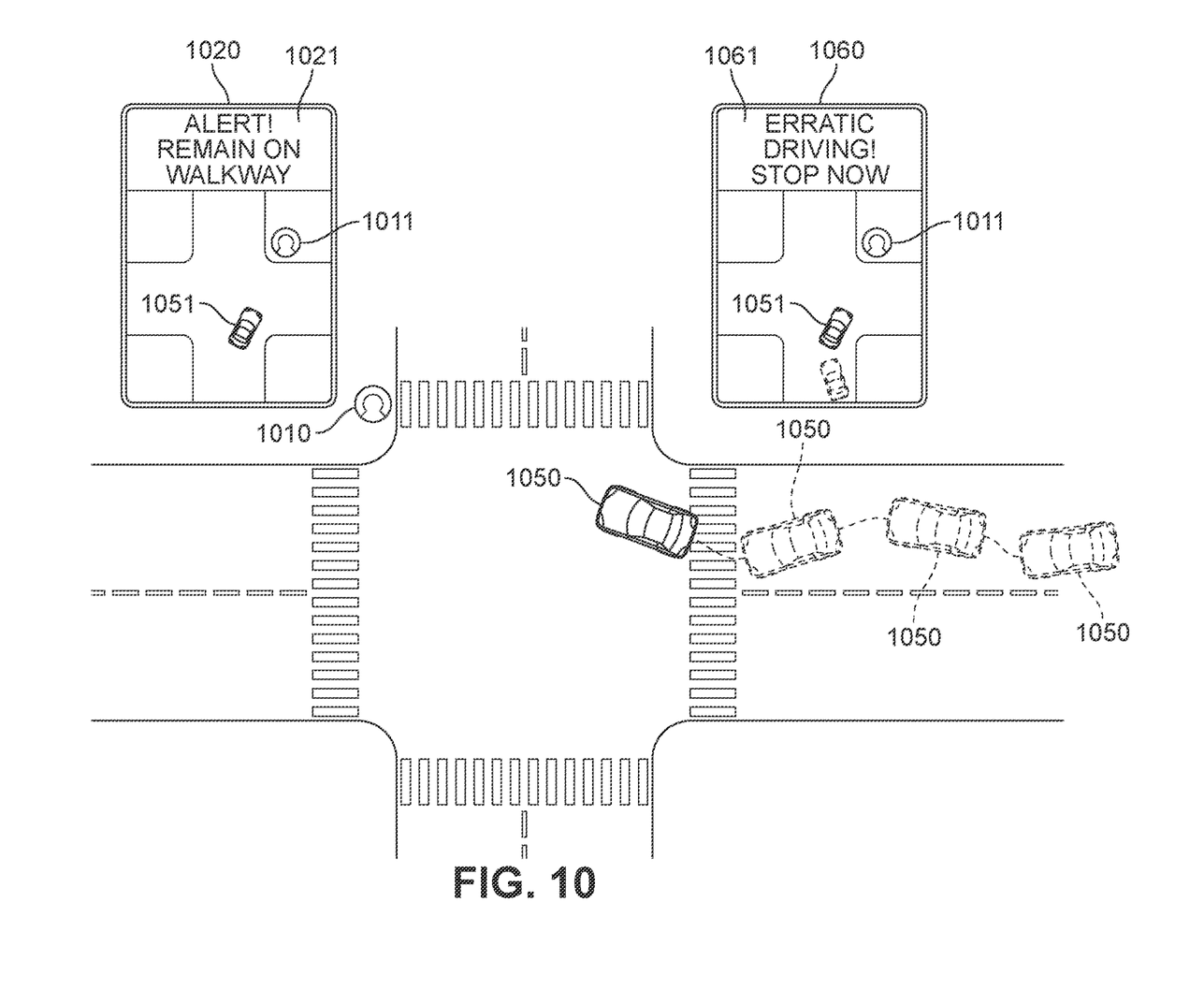
FIG. 10 is a schematic representation of an embodiment of erratic driving and a representation of the mobile devices.

FIG. 10 illustrates application of the navigation guidance system to a circumstance in which a vehicle is exhibiting erratic behavior. As illustrated, vehicle 1050 is proceeding erratically, as indicated by the phantom depictions. Meanwhile, pedestrian 1010 stands on the sidewalk. As the vehicle enters the intersection, the navigation system, through central processing server 190, sends navigation guidance to pedestrian 1010, identified on the mobile devices at 1011. Guidance for pedestrian 1010 appears in the visual region 1021 of mobile device 1020. The guidance includes an admonition to remain alert and on the sidewalk. Audio guidance would be essentially the same. Vehicle 1050 receives much more controlling guidance, as illustrated in visual box 1061 of mobile device 1060. As can be seen, the guidance includes a characterization of the driving and guidance to stop now. The auto-brake system will be employed by direct action of central processing server 190 to the brakes of the car to bring vehicle 1050 to a stop, preferably before a collision occurs.

In another aspect, an embodiment relates to system for preventing collisions between users of the system including a mobile application. Each user uses a mobile device having an instance of a mobile application operating therein. A first instance of the application is associated with a first user and a second instance of application associated with a second user. The mobile device exchanges information with a central processing server.

The central processing server receives first path information relating to a first path of the first user and second path information relating to a second path of the second user. The central processing server determines a first projected path of the first user and a second projected path of the second user.

The central processing server compares the first projected path and the second projected path and identifies points of intersection putting the first user and the second user at risk of a collision. The central processing server sends to the first user navigation guidance to the mobile application to avoid the collision.

Another aspect of the disclosure is directed to a method for preventing collisions between a first user of a navigation system and a second user of the navigation system. In accordance with an embodiment, the method includes providing information about a first path of the first user and a second path of the second user to a central processing server. A first projected path of the first user and a second projected path of the second user are determined. The first projected path of the first user and the second projected path of the second user are compared. The purpose of the comparison is to identify points of intersection. A point of intersection puts the first user and the second user at risk of a collision.

In an embodiment, information is exchanged between the central processing server and a mobile application. A first instance of the application is associated with the first user and a second instance of the application is associated with the second user. Navigation guidance is provided to the first instance of the mobile application.

For convenience and easy of description throughout this part of the application, the first user will be described as a pedestrian. As described above, a pedestrian, a bicyclist, one riding a scooter or a skateboard, and riders of other types of unpowered or low powered modes of transport may be considered as a pedestrian. Further, the second user will be described as a motorized vehicle, such as a car, truck, bus, van, or similar vehicle.

FIG. 4 illustrates an embodiment wherein mobile device 430 and mobile device 470 host an instance of a mobile application. The application aids in obtaining information about the path of pedestrian 410 and the path of vehicle 450. For example, the instance of the application in mobile device 430 may record or transmit position information to an internet navigation system. Thus, mobile device 430 may record position information as a function of time so that a speed may be determined and the path of pedestrian 410 may be established. In another embodiment, mobile device 430 may transmit position information as a function of time to a central processing server in the navigation system, such as central processing server 190. Similarly, the instance of the application in mobile device 470 may record or transmit information to central processing server 190 relating to position and speed of vehicle 450. In FIG. 4, mobile device 470 illustrates that a planned route 480 has been identified for vehicle 450. Also, pedestrian 410 is stationary. Thus, a collision between pedestrian 410 and vehicle 450 is unlikely, and no navigation guidance is provided.

FIG. 6 illustrates a circumstance in which significant and continuous navigation guidance is provided. FIG. 6 illustrates a likely collision and the moments just before the collision, which are shown in phantom. In this embodiment, vehicle 650 has begun a turn that will take the vehicle through the crosswalk. Pedestrian 610 has already entered the crosswalk. This scenario is depicted on both pedestrian mobile device 650 and vehicle mobile device 670, where pedestrian 610 is depicted as 611 and vehicle 650 is depicted as vehicle 651. The path 658 of vehicle 651 is shown, and the predicted path of vehicle 651 is shown as 659. The predicted path of pedestrian 611 is not shown on the mobile device because it is so short.

The data provided and calculated herein may be shared with a central processing server 190 having processor 191, memory 192, and server 193. Necessary calculations may be made in a GPS system, in the mobile application, in a central processing server, or any other calculating environment in the navigation system. Thus, any manner of accomplishing the necessary calculations may be undertaken.

The importance of calculations to determine paths and to project paths of moving objects is clearly illustrated by the circumstance illustrated in FIG. 6. Information about the path of pedestrian 610 is gathered. The importance of accurately and precisely determining speeds, direction, and timing are illustrated in the scenario of FIG. 6. An error in calculations in such circumstances could make navigation guidance useless.

Moments before the likely collision, navigation guidance is provided through mobile device 650 to pedestrian 610 to stop and to go back, both visually at 621 and audibly at 622, if pedestrian 610 has selected these features. At the same time, vehicle 650 is instructed through mobile device 670 to stop because there is a pedestrian in the projected path. Vehicle 650 receives both visual warning 661 and audio warning 662.

If pedestrian 610 or vehicle 650 does not obey the navigation guidance provided, they move closer to a collision, as shown by movement arrow 605, to positions pedestrian 612 and vehicle 652. Vehicle 650 moves the distance illustrated by distance arrow 655. At that time, pedestrian 612 and vehicle 652 are essentially co-located, indicating that a collision may have or did occur. Mobile device 680 indicates to vehicle 652 that the brake was automatically applied and illustrates a potential collision between the pedestrian, illustrated as pedestrian 613 on mobile device 680, and the vehicle, illustrated as 653 on mobile device 680. The same display appears on mobile device 640 used by pedestrian 612, but the navigation guidance is to go back, as illustrated at the visual guidance 623 and audible guidance 624 on mobile device 640. Mobile device 640 also suggests that any injury be reported.

FIG. 9 also indicates the importance of timing and calculations, and resultant predictions. Pedestrian 910 and pedestrian 912 in FIG. 9 are exhibiting similar behaviors at essentially the same time, yet only pedestrian 912 is in great danger of being hit by a vehicle on the street. The difference is that vehicle 950 is not expected to turn into the path of pedestrian 910, in accordance with path 982. However, vehicle 950 is expected to turn, and calculations and projections or predictions identify the significant possibility of a collision between pedestrian 912 and vehicle 950.

In embodiments, calculation of future positions, projected paths, and other predictive tools used to predict intersections of future or projected paths measure speed and distance, determine the status of traffic signals, and other information. The skilled practitioner recognizes that events happen more quickly at high speed. Speed may serve to make predictions less accurate because there are opportunities to change speed, and such changes are likely to be made in the normal course of travel. Speed also lengthens the distance at which a user must be considered in the system. Greater distances also afford greater opportunities for changes, and thus inaccuracies. Thus, users may configure the central processing server or the mobile device to accommodate for such changes, perhaps by adjusting sensitivity to speed change, direction change, or other considerations.

Also, users may seek to adjust the warnings to accommodate the type, frequency, urgency, or other aspects to accommodate the type of transportation they are using. For example, a bus passenger may prefer to be warned only about severe collisions, or may turn off the device. In contradistinction, a pedestrian may prefer to have high sensitivity to all potential collisions.

Further, in view of the uncertainty introduced by speed, distance, and type of vehicle, projected paths are subject to error. Thus, the system may establish a 'confidence factor' or 'likelihood of collision' factor that may inform the users of the likelihood that a collision would result. Users may then choose to receive all warnings, or only those warnings associated with predicted results that are likely to lead to a collision.

The system also may be configured to warn both users to a potential collision, even if one user is not actively engaged in the system.

Figure 11:
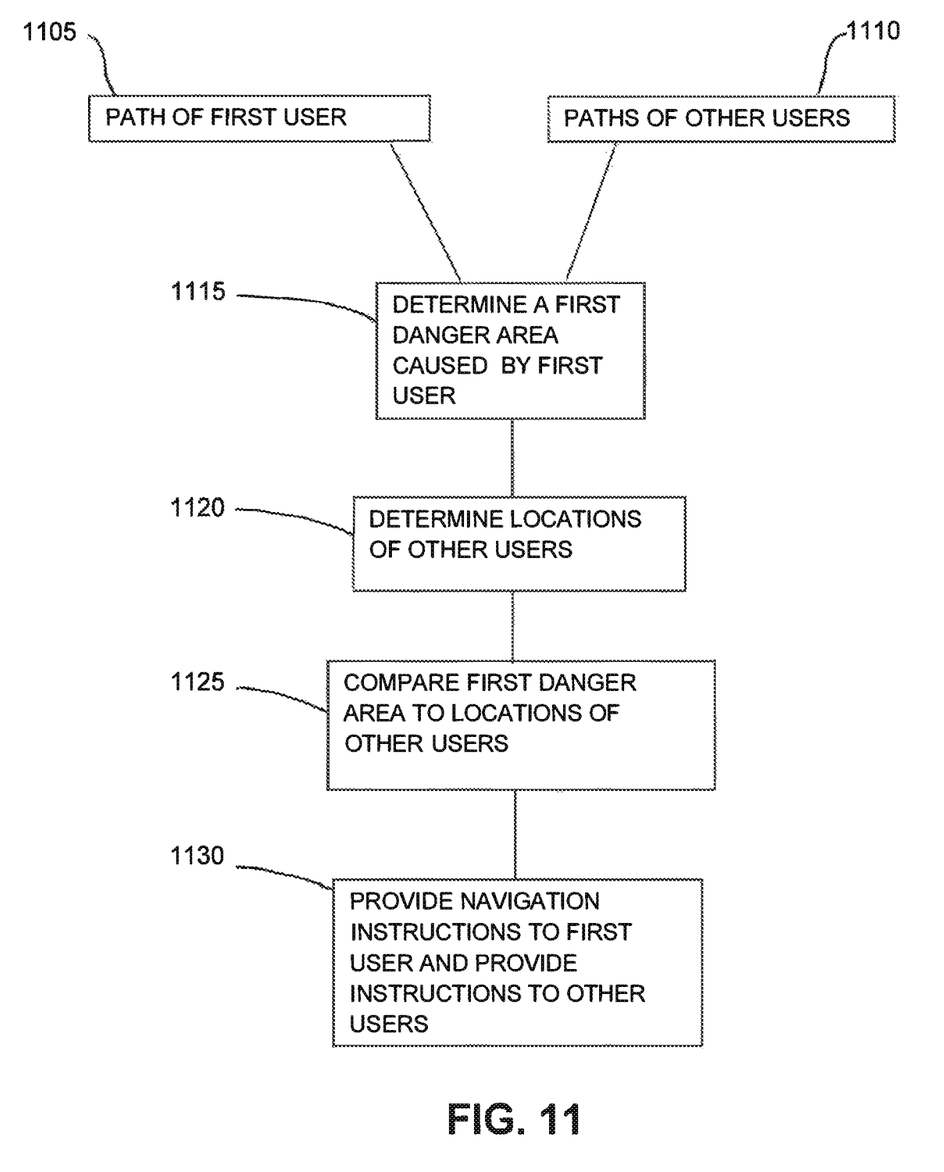
FIG. 11 is a schematic representation of an embodiment of a method of the disclosure.

In some embodiments, the disclosure is directed to a method, as shown in FIG. 11, for preventing collisions with a first erratic user of a navigation system and other users of the navigation system. In accordance with the method, information about a first path of the first user 1105 and locations of other users 1110 are provided to a central processing server 1115. The server determines a first danger area in which the first user is likely to operate 1120. The server then compares the first danger area and the locations of other users and identifying points of intersection putting the first user and the other users at risk of a collision 1125. The system then provides navigation directions to the other users of the navigation system and provides a warning to the erratic user 1130.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for preventing collisions between a vehicle and a pedestrian, wherein the system includes a central processing server configured to:

receive first path information relating to a first path of the vehicle and second path information relating to a second path of the pedestrian;

determine a first projected path of the vehicle and a second projected path of the pedestrian using the first path information and the second path information;

compare the first projected path and the second projected path and identify points of intersection putting the vehicle and the pedestrian at risk of a collision;

determine a predicted likelihood of the collision; and send a first navigation guidance to avoid the collision to the vehicle, based on the predicted likelihood of the collision and a user preference associated with a transportation type of the vehicle;

wherein the first navigation guidance is based on a confidence factor associated with the predicted likelihood of the collision.

2. The system of claim 1, wherein the central processing server is further configured to receive traffic signal preemption information, and the central processing server is further configured to determine the first navigation guidance using the traffic signal preemption information.

3. The system of claim 2, wherein the traffic signal preemption information is traffic signal preemption information resulting from receiving an indication from an emergency vehicle, the information comprising changes to a right of way.

4. The system of claim 1, wherein the central processing server is further configured to send a second navigation guidance to avoid the collision to the pedestrian.

5. The system of claim 4, wherein the central processing server is further configured to send the second navigation guidance to the pedestrian by instructing the pedestrian to remain on a sidewalk.

6. The system of claim 4, wherein the central processing server is further configured to send the second navigation guidance to the pedestrian by instructing the pedestrian to return to a sidewalk.

7. A system for preventing collisions between a first user of the system, a second user of the system, and a third user of the system, wherein the system includes a central processing server configured to:

obtain first path information relating to a first path of the first user, second path information relating to a second path of the second user, and third path information relating to a third user;

determine a first projected path of the first user, a second projected path of the second user, and a third projected path of the third user using the first path information, the second path information, and the third path information;

provide a first navigation guidance to the second user to avoid a first collision if a comparison of the first projected path and the second projected path identifies a point of intersection putting the first user and the second user at risk of the first collision, the first collision being associated with a predicted first likelihood, the first navigation guidance being based on the predicted first likelihood; and provide a second navigation guidance to the third user to avoid a second collision if a comparison of the first projected path and the third projected path identifies a point of intersection putting the first user and the third user at risk of the second collision, the second collision being associated with a predicted second likelihood, the second navigation guidance being based on the predicted second likelihood;

wherein at least one of the first navigation guidance and the second navigation guidance is an instruction to return to a safe area.

8. The system of claim 7, wherein the central processing server is further configured to provide at least one of a third navigation guidance to the first user when the first navigation guidance is provided to the second user, a fourth navigation guidance to the first user when the second navigation guidance is provided to the third user, and a fifth navigation guidance to the second user when the second navigation guidance is provided to the third user.

9. The system of claim 7, wherein the first navigation guidance is further based on a user preference of the second user associated with a type of transportation of the second user.

10. The system of claim 7, wherein the first navigation guidance is further based on a confidence factor associated with the predicted first likelihood.

11. The system of claim 7, wherein the second navigation guidance is further based on a user preference of the third user associated with a type of transportation of the third user.

12. The system of claim 7, wherein the second navigation guidance is further based on a confidence factor associated with the predicted second likelihood.

13. The system of claim 7, wherein the first navigation guidance and the second navigation guidance are provided at different times.

14. The system of claim 13, wherein the different times are based on a first time associated with the point of intersection putting the first user and the second user at risk of a collision and a second time associated with the point of intersection putting the first user and the third user at risk of a collision.

15. A method for preventing collisions between an erratic driver of a vehicle of a navigation system and a pedestrian of the navigation system, the method comprising;

receiving information about a path of the erratic driver and a location of the pedestrian by a central processing server;

determining a danger area in which the erratic driver is likely to drive, based on the information about the path of the erratic driver;

comparing the danger area and the location of the pedestrian to identify a point of intersection putting the erratic driver and the pedestrian at risk of a collision;

determining a predicted likelihood of the collision;

providing a warning to the erratic driver, based on the predicted likelihood of the collision and a user preference of the erratic driver associated with a type of transportation of the erratic driver; and wherein the warning provided to the erratic driver is based on a confidence factor associated with the predicted likelihood of the collision.

16. The method of claim 15, further comprising engaging auto-braking of the vehicle of the erratic driver.

17. The method of claim 15, wherein the erratic driver deviates from a straight driving path as the erratic driver travels along a road.

18. The method of claim 15, further comprising providing navigation directions to the pedestrian of the navigation system, based on the predicted likelihood of the collision and a sensitivity to collisions associated with the pedestrian.

19. The method of claim 18, wherein the navigation directions provided to the pedestrian of the navigation system warn the pedestrian to return to a sidewalk.

20. The method of claim 18, wherein the navigation directions provided to the pedestrian of the navigation system are further based on a confidence factor associated with the predicted likelihood of the collision.

\* \* \* \* \*